(12) United States Patent
Nomoto et al.

(10) Patent No.: US 10,956,509 B2
(45) Date of Patent: Mar. 23, 2021

(54) MATERIAL DEVELOPMENT ASSISTANCE SYSTEM AND MATERIAL DEVELOPMENT ASSISTANCE METHOD

(71) Applicant: HITACHI, LTD., Tokyo (JP)

(72) Inventors: Etsuko Nomoto, Tokyo (JP); Yuko Tsuchiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 162 days.

(21) Appl. No.: 16/295,863

(22) Filed: Mar. 7, 2019

(65) Prior Publication Data

US 2020/0089706 A1 Mar. 19, 2020

(30) Foreign Application Priority Data

Sep. 13, 2018 (JP) .............................. JP2018-171338

(51) Int. Cl.
| | | |
|---|---|---|
| G06F 16/906 | (2019.01) | |
| G09F 3/02 | (2006.01) | |
| G06F 16/901 | (2019.01) | |
| G02B 27/01 | (2006.01) | |

(52) U.S. Cl.
CPC ......... *G06F 16/906* (2019.01); *G02B 27/017* (2013.01); *G06F 16/9017* (2019.01); *G06F 16/9024* (2019.01); *G09F 3/02* (2013.01); *G02B 2027/0187* (2013.01); *G09F 2003/0272* (2013.01)

(58) Field of Classification Search
CPC .. G06F 3/0484; G06F 40/137; G06F 16/9017; G06F 16/9024; G06F 16/906
USPC ....................................................... 707/738
See application file for complete search history.

(56) References Cited

U.S. PATENT DOCUMENTS

| | | | |
|---|---|---|---|
| 2013/0054603 A1* | 2/2013 | Birdwell | G06K 9/6253 707/738 |
| 2013/0116979 A1* | 5/2013 | Bhaskara | G06F 30/00 703/1 |
| 2016/0048930 A1 | 2/2016 | Sugiyama et al. | |

FOREIGN PATENT DOCUMENTS

| | | |
|---|---|---|
| JP | 2012-155662 A | 8/2012 |
| JP | 2014-211763 A | 11/2014 |

OTHER PUBLICATIONS

Biovia Corporate White Paper "Speeding up the Pace of Chemical Research and Development". http://media.accelrys.com/literature/whitepapers/chemicals-r-d-whitepaper.pdf.

\* cited by examiner

*Primary Examiner* — Hung T Vy
(74) *Attorney, Agent, or Firm* — Volpe Koenig

(57) ABSTRACT

The material development assistance system includes a first control unit giving, based on input information inputted as the prototype plan of the material and a keyword configuring a keyword tree stored in a storage unit, a prototype ID for identifying the prototype plan, a second control unit associating the keyword corresponding to the input information given the prototype ID with the index of the input information and accumulating the associated index in the storage unit as a tree structure for each classification group, a third control unit determining whether or not the index for the classification group accumulated in the storage unit and the input information are in a predetermined relation and when determining that the index and the input information are in the predetermined relation, reading a past prototype plan using the index from the storage unit, and a fourth control unit outputting a new prototype plan.

10 Claims, 15 Drawing Sheets

FIG. 12

| menu | PROTOTYPE PLAN | PLAN REFERRING | PROCESS PLAN | LIST DISPLAY | |
|---|---|---|---|---|---|
| OBJECT | XXX CHARACTERISTIC IS EQUAL TO OR MORE THAN YY | | | | |
| MILESTONE | REVIEW JUNE, 2018<br>FINAL REPORT MARCH, 2019 | | | | |
| RAW MATERIAL | TYPE | 2 ▼ | MATERIAL A, MATERIAL B | | |
| NUMBER OF SAMPLES | | 30 ▼ | PARAMETER | MIXING RATIO, TEMPERATURE | |
| GRAPH | NUMBER | 2 ▼ | VERTICAL AXIS /HORIZONTAL AXIS | CHARACTERISTIC 1 /SAMPLE ID | |
| | | | | CHARACTERISTIC 2 /SAMPLE ID | |

1201

MATERIAL DEVELOPMENT ASSISTANCE SYSTEM AND MATERIAL DEVELOPMENT ASSISTANCE METHOD

BACKGROUND

The present invention relates to a technique for assisting the research and development of a material.

RELATED ART

An operation system using data information as a base is adopted at a manufacturing site in the manufacturing industry, but each process of research is operated manually at a research and development site where materials adopted for products and the products made by combining the materials are manufactured, so that the sharing of information of the working process, know-how, failure, and the like is delayed. Accordingly, moves to store and share material research data manually recorded as electronic data have come out, and for example, a method for identifying handwritten letters at high precision, as illustrated in Japanese Unexamined Patent Application Publication No. 2012-155662, is disclosed. Also, as a working system for observing the working process itself, for example, a system for managing information generated from images imaged by using an imaging device mounted on the worker and a method thereof, as illustrated in Japanese Unexamined Patent Application Publication No. 2014-211763, is disclosed.

SUMMARY OF THE INVENTION

The person in charge of research and development is hard to accept increasing in the number of duties at taking out material research and development information as electronic data and being forced to have new load by changing the process. In storing the material research and development information, even when the person in charge of research and development converts the handwritten notes of other persons to electronic data, it is difficult to understand the contents because the amount of the information and the form of recording the information are different depending on the persons. Also, even when the working process is directly imaged, the working designated from the image can be extracted to be information, but it is difficult to refer to the information from the new searching word, so that there is a problem that the information of the working process, know-how, failure, and the like cannot be shared.

An object of the present invention is to provide a material development assistance system and a material development assistance method, which can accumulate and manage reusable information without increasing the load of a person in charge in material research and development.

A material development assistance system according to the present invention is a material development assistance system that assists the research and development of a material. The material development assistance system includes a first control unit giving, based on input information inputted as the prototype plan of the material from a user and a keyword configuring a keyword tree stored in a storage unit, a prototype ID for identifying the prototype plan to the input information, a second control unit associating the keyword corresponding to the input information given the prototype ID with the index of the input information and accumulating the associated index in the storage unit as a tree structure for each classification group that is the unit of the research and development of the material, a third control unit determining whether or not the index for the classification group accumulated in the storage unit and the input information are in a predetermined relation and when determining that the index and the input information are in the predetermined relation, reading a past prototype plan using the index from the storage unit, and a fourth control unit outputting, as the plan of the user, a new prototype plan created by referring to the read past prototype plan, the new prototype plan being given the prototype ID and a sample ID for identifying the material used in the prototype plan.

Also, the present invention is grasped as a material development assistance method that is performed in the material development assistance system.

Advantageous Effects of Invention

According to the present invention, the reusable information can be accumulated and managed without increasing the load of the person in charge.

BRIEF DESCRIPTION OF THE DRAWINGS

FIG. 12 illustrates the example of the plan input screen display of the material development assistance system;

DETAILED DESCRIPTION OF THE PREFERRED EMBODIMENTS

Figure 1:
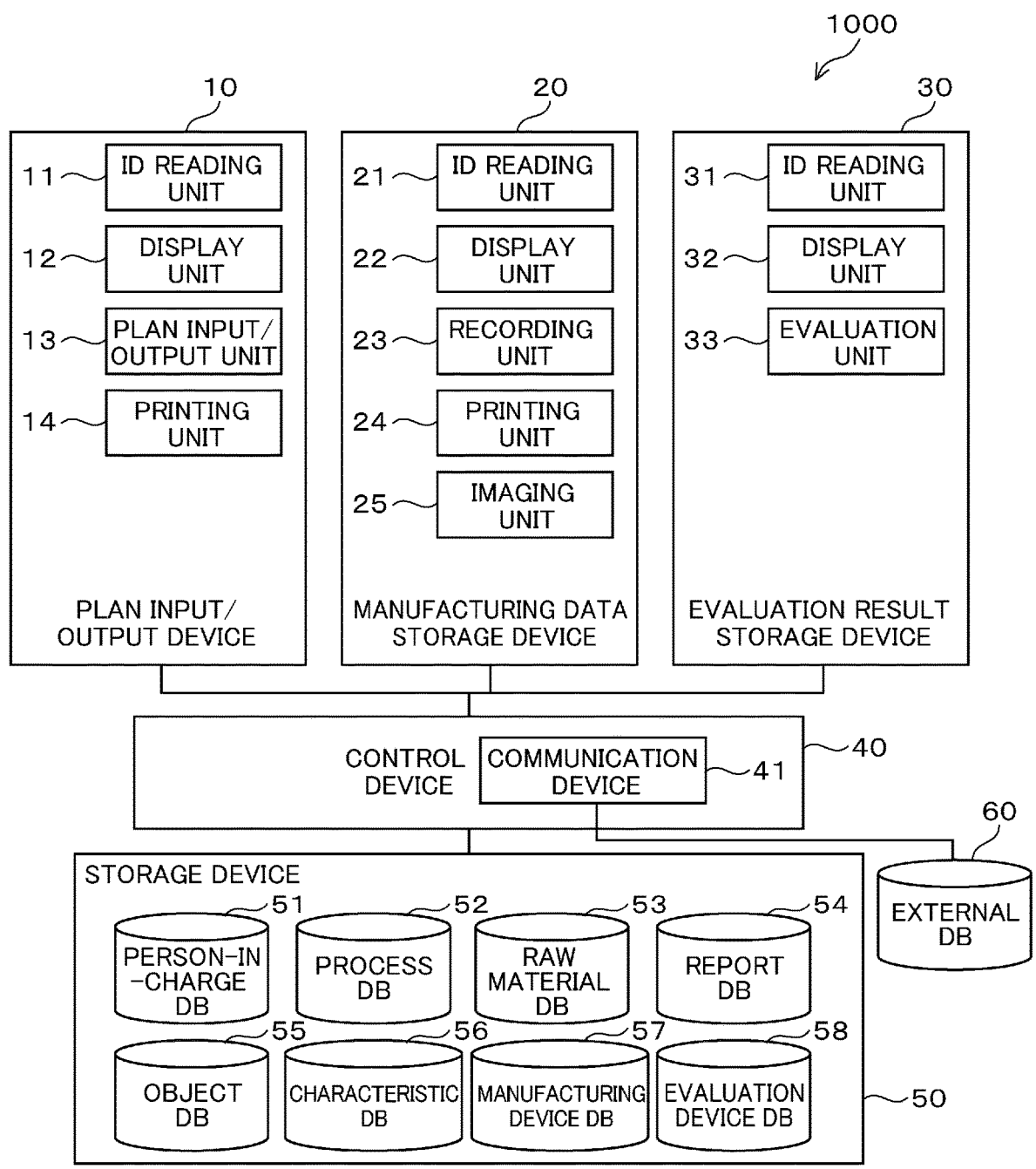
FIG. 1 is a block diagram of a material development assistance system.

Embodiments will be described below in detail with reference to the drawings. However, the present invention is not construed as being limited to the described contents of the following embodiments. Those skilled in the art can easily understand that in the scope not departing from the idea or purport of the present invention, its specific configuration can be changed.

In the configuration of the invention described below, the same reference numerals are used for the same portions or portions having similar functions so as to be shared between the different drawings, and the overlapped description is sometimes omitted.

The denotation of "first", "second", "third", and the like in this specification and the like is given for identifying the components, and does not necessarily limit the number or order. Also, the number for identifying each component is used for each context, and the number used in one context does not necessarily represent the same configuration in other contexts. Also, the component identified by a certain number is not inhibited from serving as the functions of the components identified by other numbers.

To simply understand the invention, there is the case where the position, size, shape, range, and the like of each configuration illustrated in the drawings and the like do not represent the actual position, size, shape, range, and the like. Therefore, the present invention is not necessarily limited to the position, size, shape, range, and the like disclosed in the drawings and the like. The component represented in the singular herein includes the plural, unless otherwise specified in the contexts.

First Embodiment

FIG. 1 is a block diagram of a material development assistance system that assists the management of research and development related to a material. As illustrated in FIG. 1, a material development assistance system 1000 has a device group for collecting information from a person in charge of research and development, and the device group includes three devices. The respective devices respectively have a plan input/output device 10 that inputs and outputs a research and development plan and a final report, a manufacturing data storage device 20 that stores the information of a process for manufacturing the material, such as a sample, and an evaluation result storage device 30 that receives and stores evaluation results from an evaluation unit 33. The information collected by these devices is outputted to a control device 40 so as to be subjected to the necessary process, and is then stored in a storage device 50. The control device 40 has a communication device 41 for communicating with each of the plan input/output device 10, the manufacturing data storage device 20, and the evaluation result storage device 30.

Each of the plan input/output device 10, the manufacturing data storage device 20, the evaluation result storage device 30, and the control device 40 includes, for example, a typical computer as the hardware of a PC (Personal Computer) and the like. Also, the storage device 50 includes, for example, a typical storage device, as the hardware of an HDD (Hard Disk Drive) and the like.

The information provided by the person in charge of research and development includes an experiment plan associated with the person in charge, a prototype manufactured according to the experiment plan, and its evaluation results. When the person in charge himself/herself uses his/her own information, his/her own information is required to be associated with the ID of the person in charge. Therefore, when experiment plans are inputted to the plan input/output device 10, a plan input/output unit 13 of the plan input/output device 10 transmits the inputted experiment plans to the control device 40, and the control device 40 automatically gives an experiment management number (for example, a lot number) to each of the experiment plans received from the plan input/output device 10, and consistently manages the experiment plan by the given experiment management number. Likewise, when receiving the information collected by each of the manufacturing data storage device 20 and the evaluation result storage device 30, the control device 40 associates the collected information with the ID of the person in charge. Therefore, the respective devices for collecting the information respectively have ID reading units 11, 21, and 31 that read the ID of the person in charge.

Figure 2:
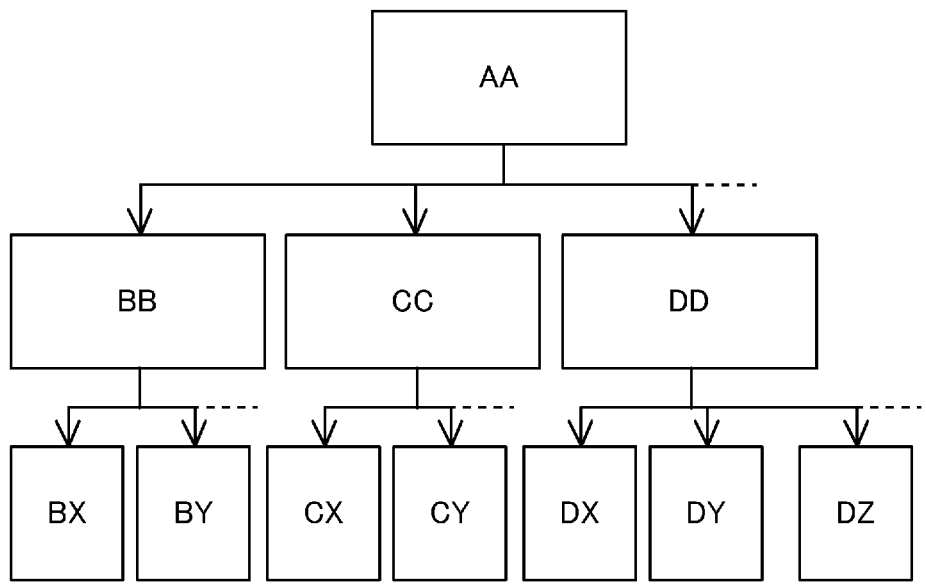
FIG. 2 illustrates the image of the keyword tree of the material development assistance system.

When storing these collected information pieces, the control device 40 provides a data form, such as a layout and a format, keyword-analyzes and classifies the words included in these collected information pieces, and then give indexes to the classified words. In the classification method, for example, a keyword tree, as illustrated in FIG. 2, is created in such a manner that a keyword representing the detail is previously associated in a tree shape with a classified word in a classification group that is the unit of the research and development of the material, such as the person-in-charge name, the substance name, the characteristic and performance of the material, the material structure, the material manufacturing process, and the like, and the keyword is associated with the classified word, thereby storing the associated keyword and the classified word in the storage device 50. FIG. 2 illustrates that with a certain classification group "AA" as a root, for example, keywords, such as nodes "BB", "CC", and "DD" are located in a first hierarchy, and further, for example, for the highest rank node "BB", keywords, such as "BX" and "BY", are further located in a second hierarchy.

As the classification group, it is possible to use the classification group corresponding to each DB (database) stored in the storage device 50 illustrated in FIG. 1. For example, it is possible to use each classification group stored in each of a person-in-charge DB 51 for classifying the collected information by the person in charge, a process DB 52 for classifying the collected information by the process for manufacturing the sample, a raw material DB 53 for classifying the collected information by the raw material configuring the sample, a report DB 54 for classifying the collected information by the report related to the manufactured sample, an object DB 55 for classifying the collected information by the object to manufacture the sample, a characteristic DB 56 for classifying the collected information by the characteristic of the sample, a manufacturing device DB 57 for classifying the collected information by the manufacturing device for manufacturing the sample, and an evaluation unit DB 58 for classifying the collected information by the evaluation unit for evaluating the manufactured sample.

The control device 40 defines the keyword arranged at the terminal end of the keyword tree as the index of a newly collected word, and stores the keyword in the classification group to which the collected information belongs, among the classification groups stored in the storage device 50. In searching for the information associated with the classification group, when a keyword present upstream of a word defined as an index or a word corresponding to a keyword is designated as a searching word, the control device 40 displays, on display units 12, 22, and 32, the experiment management number having the corresponding index and the information of the experiment plan associated with the experiment management number and the like. The index, the experiment management number, and the experiment plan are previously associated with each other, and are stored in the storage device 50.

Figure 3:
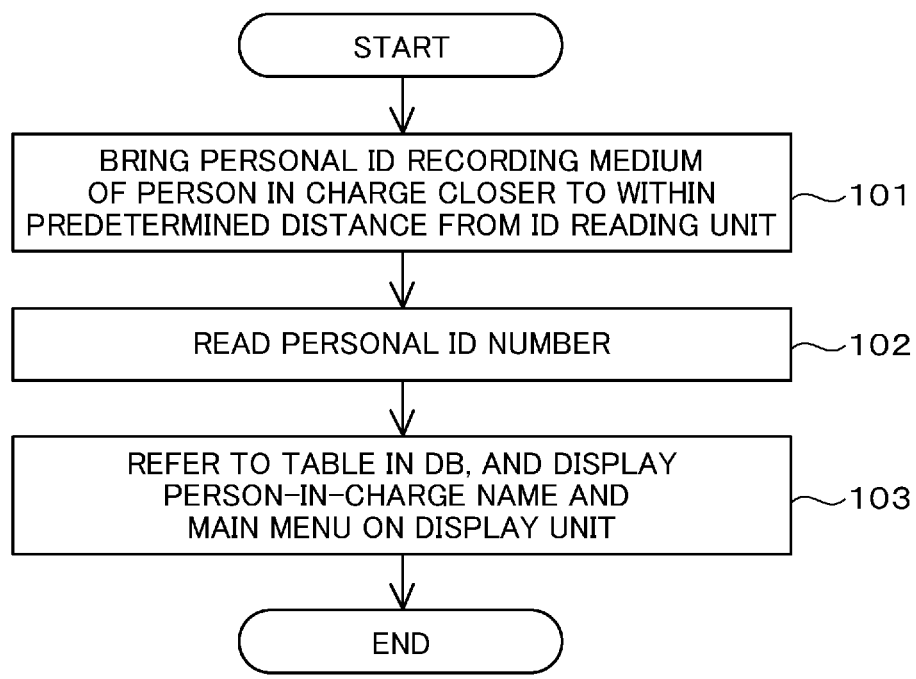
FIG. 3 is a person-in-charge identification flowchart of the material development assistance system.

FIGS. 3 to 8 are flowcharts illustrating the process procedures of processes performed in the material development assistance system. The flow of FIG. 3 is a person-in-charge identification process for identifying the person in charge.

In step 101, the person in charge holds a recording medium in which his/her own personal ID is recorded, for example, in the form of burying an IC chip in the card and the name tag. The person in charge brings the recording medium closer to within a predetermined distance necessary for reading with respect to any one of the ID reading units 11, 21, and 31 of the devices.

In step 102, any one of the ID reading units 11, 21, and 31 reads the personal ID of the person in charge recorded in the recording medium brought closer to any one of the ID reading units 11, 21, and 31. As the personal ID recording medium, it is possible to use, for example, a medium in which the IC chip in which the personal ID of the person in charge is recorded is buried in the working clothes or the protector that the person in charge wears, and a medium for performing biological identification from biological information that represents the physical information inherent in the person in charge himself/herself. When these media are used, the personal ID can be read in such a manner that the person in charge himself/herself unconsciously approaches the ID reading unit.

In step 103, the control device 40 refers to the person-in-charge DB 51 classified into the storage device 50, and reads the person-in-charge name stored so as to be associated with the read personal ID. The control device 40 transmits the read person-in-charge name and the personal ID to the same device as the ID reading unit that has read these information, and allows any one of the display unit 12 of the device 10, the display unit 22 of the device 20, and the display unit 32 of the device 30 to display a main menu including the personal ID and the person-in-charge name. The main menu includes at least four menus of experiment plan creation, sample manufacturing, sample evaluation, and report creation.

Figure 4:
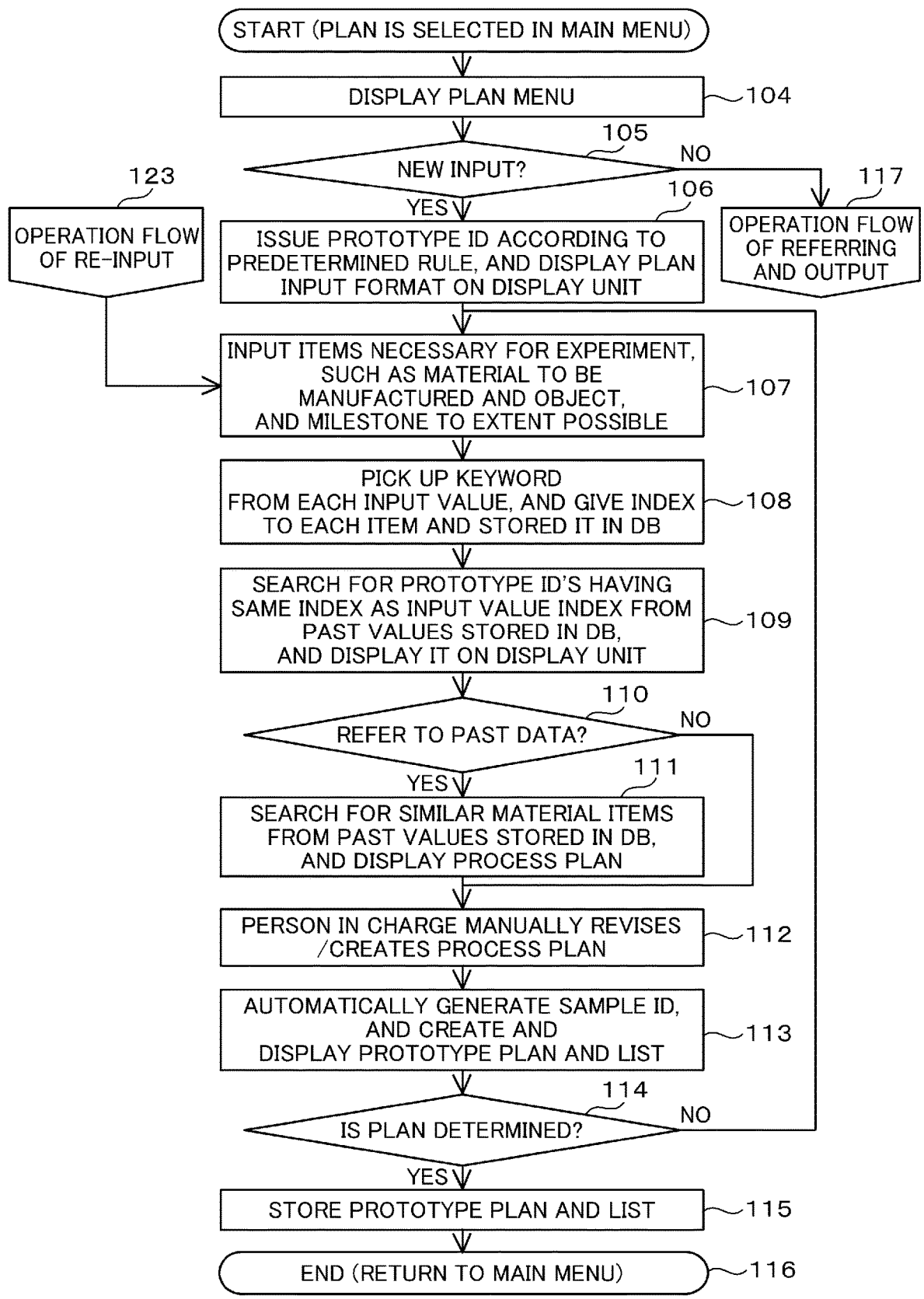
FIG. 4 is a plan input flowchart of the material development assistance system.

FIG. 4 is a flowchart illustrating the process procedure of a plan list creation process that is started when the person in charge selects the experiment plan creation from the main menu. In the following steps, it is assumed that in the person-in-charge identification process illustrated in FIG. 3, the personal ID is read by the ID reading unit 11.

In step 104, according to the instruction from the control device 40, the plan input/output unit 13 of the plan input/output device 10 displays a plan menu on the display unit 12. The plan menu includes at least three menus of the new input, referring and correction, and output of the plan.

In step 105, the plan input/output unit 13 receives, from the person in charge, the new input from among the menus. In the case of the new input, the plan input/output unit 13 goes to step 106, and in the case of other than the new input, the plan input/output unit 13 goes to a operation flow of referring and output 117.

In step 106, the plan input/output unit 13 issues a prototype ID for identifying the plan to the new plan according to a predetermined rule, and displays a plan input format screen on the display unit 12. The predetermined rule may be decided by the department to which the person in charge belongs or the person in charge. The prototype ID includes, for example, a symbol related to the person-in-charge ID or the department, a number or symbol representing month and year, a serial number of each person in charge, and the like. The prototype ID is associated with each item of the following plan input format screen.

FIG. 12 is a diagram illustrating the example of the plan input format screen. As illustrated in FIG. 12, the plan input format screen includes, as the prototype plan of a prototype to be manufactured, the object of the plan, the milestone of the plan, the raw material of the prototype, the number of samples configuring the prototype, and a graph to be displayed. In step 106, each of these items is displayed in the state of an initial value (for example, null).

In step 107, the plan input/output unit 13 receives, from the person in charge, through the input device, such as a keyboard and a mouse, the input of the respective items, such as the items necessary for the experiment and the milestone. The items necessary for the experiment include, for example, the material to be manufactured, the raw material, the object, the axes of the graph illustrated in the report, and the like, and the milestone includes the periods of the report of research and development and the design review, and the like.

FIG. 12 illustrates that for example, the "object" of the prototype plan is that "The XXX characteristic is equal to or more than YY.", and as the milestone of the plan, the review is planned to be conducted in June, 2018, and the final report is planned to be made in March, 2019. Also, the prototype plan is a plan for obtaining 30 samples from two kinds of materials of the "material A" and the "material B", with the mixing ratio and the temperature as parameters, and represents that as the output results, two graphs in which the sample characteristic is represented on the vertical axis, and the sample ID of each obtained sample is represented on the horizontal axis are outputted.

In step 108, the plan input/output unit 13 transmits the respective inputted items and the prototype ID to the control device 40, and the control device 40 refers to the keyword of the keyword tree stored in the storage device 50 or the word corresponding to the keyword, and associates each of the inputted items with the keyword included in the classification group including the item, and stores the keyword in the storage device 50 as the index of the prototype ID issued in step 106. For example, the control device 40 compares each item illustrated in FIG. 12 and each item of the keyword tree (FIGS. 2, 10, and 11) to determine whether or not the item illustrated in FIG. 12 and the item of the keyword tree are the same item, and when determining the item illustrated in FIG. 12 and the item of the keyword tree are the same item, associates such the same item as the keyword with the prototype ID. At this time, in addition to the association between the items in which it has been determined that the item illustrated in FIG. 12 and the item of the keyword tree are the same item, the control device 40 also performs the association between the item located in the keyword tree as the higher order item with respect to such the same item. From this, it is apparent that the prototype ID is related to the higher order item with respect to such the same item in which it has been determined that the item illustrated in FIG. 12 and the item of the keyword tree are the same item. In step 107, the plan input/output unit 13 reads the text describing the necessary items as freely as possible from the person in charge, and in step 108, the plan input/output unit 13 extracts the necessary word (for example, the predetermined keyword or the similar keyword having the same meaning as the keyword) by text mining, and gives an index to the extracted word. The plan input/output unit 13 to which each item has been inputted from the person in charge reads, shapes, and displays the predetermined format stored in the storage device 50 by the control device 40.

In step 109, the control device 40 searches for the prototype IDs having the same index as the newly stored prototype ID from among the past prototype IDs stored in the storage device 50, and displays the prototype IDs for each classification group on the display unit 12. In the prototype IDs displayed here, the prototype IDs of different persons in charge may be included.

Figure 13:
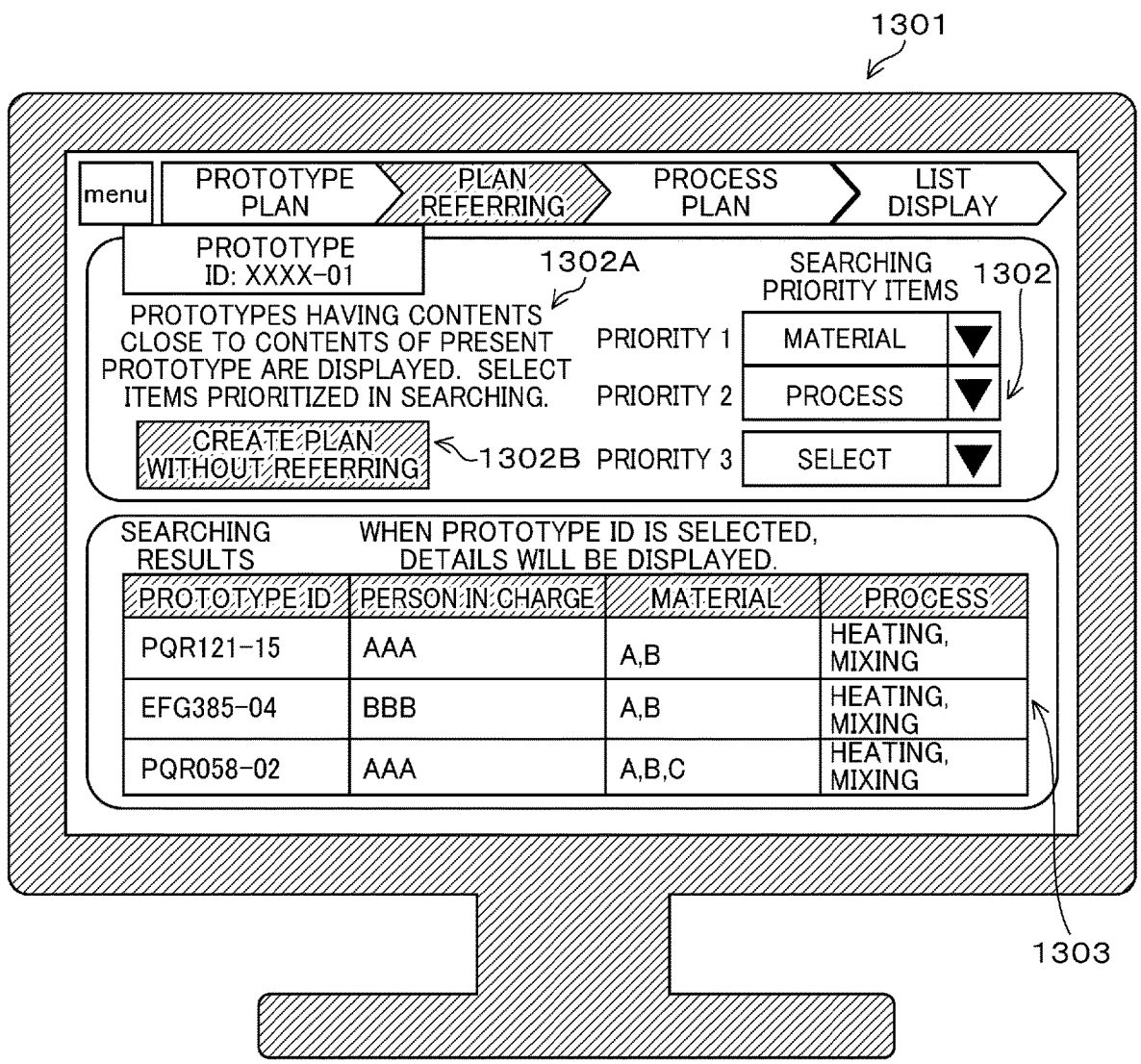
FIG. 13 illustrates the example of the prototype ID selection screen of the material development assistance system.

FIG. 13 is a diagram illustrating the example of a display screen (a prototype ID selection screen) that the plan input/output unit 13 displays on the display unit 12. As illustrated in FIG. 13, a prototype ID selection screen 1301 includes a new storage prototype ID display region 1302 including the newly stored prototype ID "XXXX-01" and the items displayed on a priority basis (in FIG. 13, priorities 1-3) among the items associated with the prototype ID, and a past storage prototype ID display region 1303 displaying the prototype IDs having the same index as the newly stored prototype ID.

On the new storage prototype ID display region 1302, a guidance display region 1302A in which displayed are the guidance to display the prototypes having the contents close to the contents of the prototype identified by the newly stored prototype ID and the guidance to promote the selection of the items prioritized during the searching and a selection button 1302B for creating the plan without referring to the past prototype IDs.

On the past storage prototype ID display region 1303, in the order closest to the case subject to the items selected as the searching priority items from among all the past prototype IDs having the same index as the present prototype ID, the past prototype IDs, the person-in-charge IDs in which the prototyping identified by the prototype IDs has been performed, and the materials and processes used for the prototyping are associated with each other, and are displayed in a list form.

FIG. 13 illustrates that the control device 40 searches for the past prototypes having the contents close to the contents of the prototype identified by the newly stored prototype ID "XXXX-01" subject to the searching priority items "material" and "process", and the results are the prototype ID "PQR121-15", "EFG385-04", and "PQR058-02". Also, FIG. 13 illustrates that for the searching, for example, the prototyping of the prototype ID "PQR121-15" is performed by the person in charge "AAA", the materials are "A, B", and the process is "heating, mixing".

In step 110, the control device 40 outputs a display screen for inquiring of the person in charge whether or not the past prototype IDs are referred to, and the plan input/output unit 13 displays the outputted display screen on the display unit 12. When determining that the person in charge has selected the referring of the past data (step 110; Yes), the control device 40 goes to step 111.

In step 111, the control device 40 allows the person in charge to select which of the classification groups of the characteristic and performance of the material, the material structure, the material manufacturing process, and the like is displayed, from the past prototype IDs searched for and displayed in step 109, and the plan input/output unit 13 displays the material manufacturing process plan of the selected prototype ID on the display unit 12.

Figure 14:
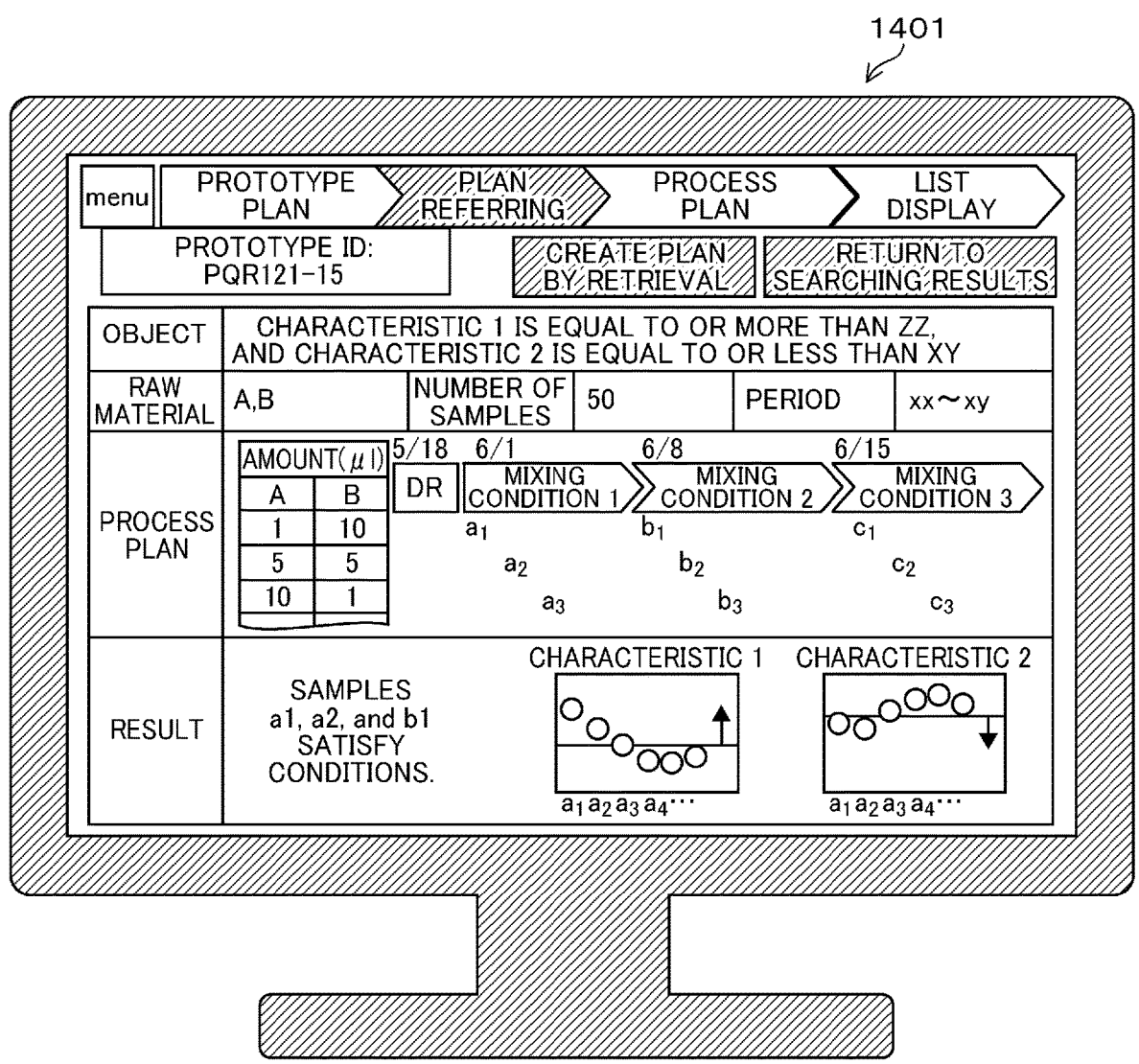
FIG. 14 illustrates the example of the process plan display screen of the material development assistance system.

FIG. 14 is a diagram illustrating the example of a display screen (a process plan display screen) that the plan input/output unit 13 displays on the display unit 12. As illustrated in FIG. 14, a process plan display screen 1401 includes the selected prototype ID, and the object, the raw material, the process plan, and the prototype result identified by the prototype ID.

FIG. 14 illustrates that for example, the object of the process plan of the prototype ID "PQR121-15" (the prototype ID selected in FIG. 13) is that "characteristic 1 is equal to or more than ZZ, and characteristic 2 is equal to or less than XY, and the raw materials are the same "A, B" as the prototype ID stored this time. Also, FIG. 14 illustrates that the number of samples is 50, and the period of the process plan is the period from xx to xy.

The process plan represents a plan to manufacture the samples sequentially from June 1 under various mixing conditions (conditions 1 to 3) by using the raw materials "A, B". Further, samples a1, a2, and b1 are samples satisfying the conditions among the samples manufactured by the plan, and the characteristics of the respective samples are represented by graphs.

On the other hand, in step 110, when the person in charge does not select the referring of the past data (step 110; No), the control device 40 goes to step 112.

In step 112, the plan input/output unit 13 creates and inputs the process plan according to the plan input format displayed in step 106, and in the case of the referring of the past data, revises the process plan displayed in step 111, and transmits these inputted contents and revised contents to the control device 40.

In step 113, the control device 40 gives sample IDs including the serial numbers in the order of manufacturing to the respective samples to be manufactured (in FIG. 12, 30 samples) according to the process plan, creates the prototype plan including the process plan and the sample list including the list of the samples to be manufactured, and the plan input/output unit 13 displays the created prototype plan and sample list on the display unit 12.

Figure 15:
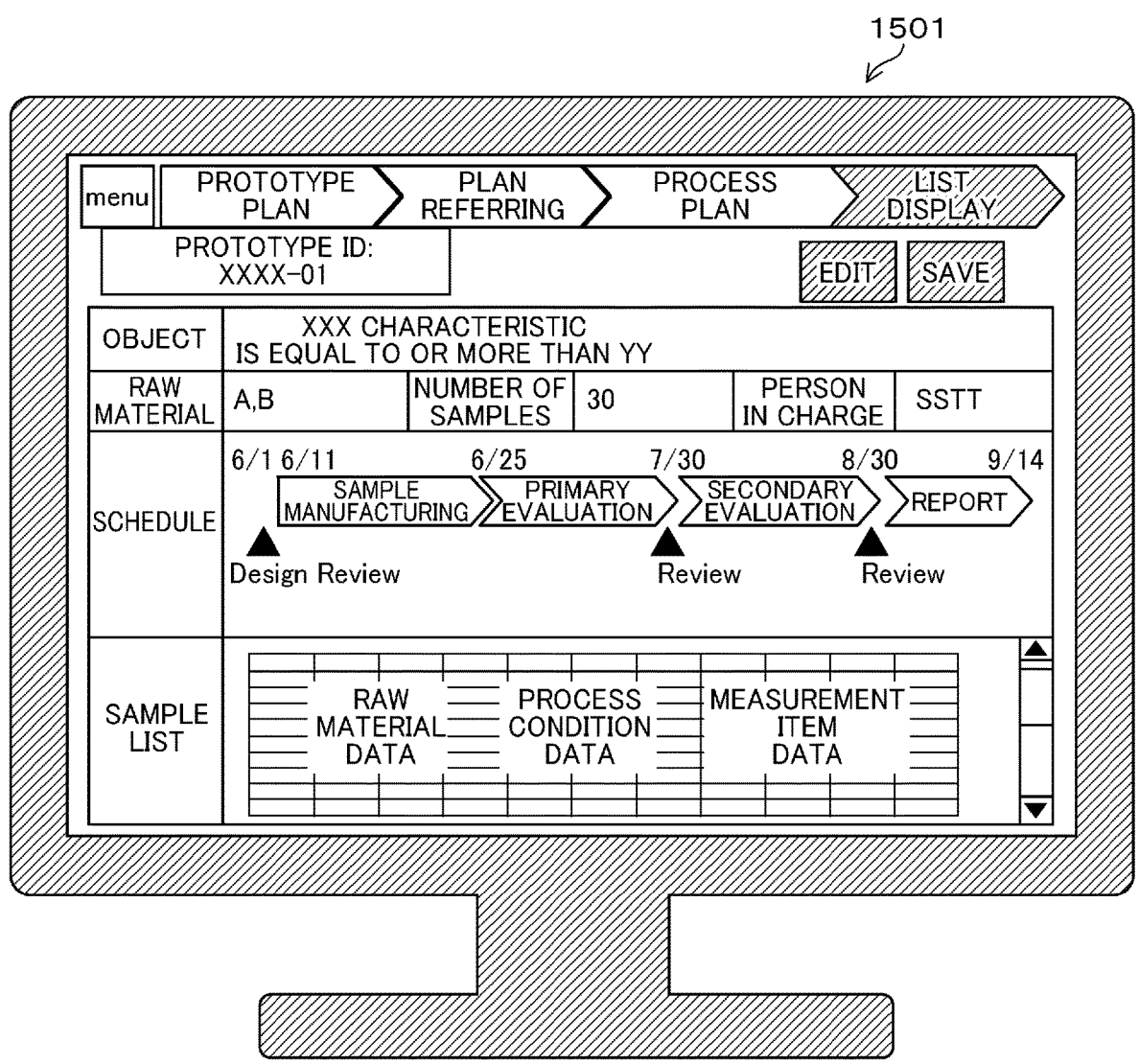
FIG. 15 illustrates the example of the prototype plan and sample list display screen of the material development assistance system.

FIG. 15 is a diagram illustrating the example of a display screen (a prototype plan and sample list display screen) that the plan input/output unit 13 displays on the display unit 12. As illustrated in FIG. 14, a prototype plan and sample list display screen 1501 includes the prototype ID, the object, the raw material, the number of samples identified by the prototype ID (these are the same as the contents of the respective items illustrated in FIG. 12), the person-in-charge ID, the plan schedule, and the list of the samples used for the prototyping.

In the plan schedule, the milestone is chronologically displayed according to the prototype plan illustrated in FIG. 12. Also, the sample list represents that the types of the samples used for the plan (a1, a2, . . . ), the raw materials (A, B) configuring each sample, the process conditions representing the conditions for each process in the sample, and the measurement value of the sample performed according to the conditions are associated with each other.

In step 114, the plan input/output unit 13 outputs, to the display unit 12, the display for inquiring of the person in charge whether the plan is determined, and determines whether or not the plan has been determined.

When determining that the plan has been determined (step 114; Yes), the plan input/output unit 13 goes to step 115, and the control device 40 stores the prototype plan and the sample list in the storage device 50. On the other hand, when determining that the plan has not been determined (step 114; No), the plan input/output unit 13 returns to step 107.

As described above, by executing the plan list creation process illustrated in FIG. 4, the person in charge can refer to the prototype plan having the prototype ID with the same index as the newly stored prototype ID, so that the working load that inputs the prototype plan of the samples can be reduced.

Figure 5:
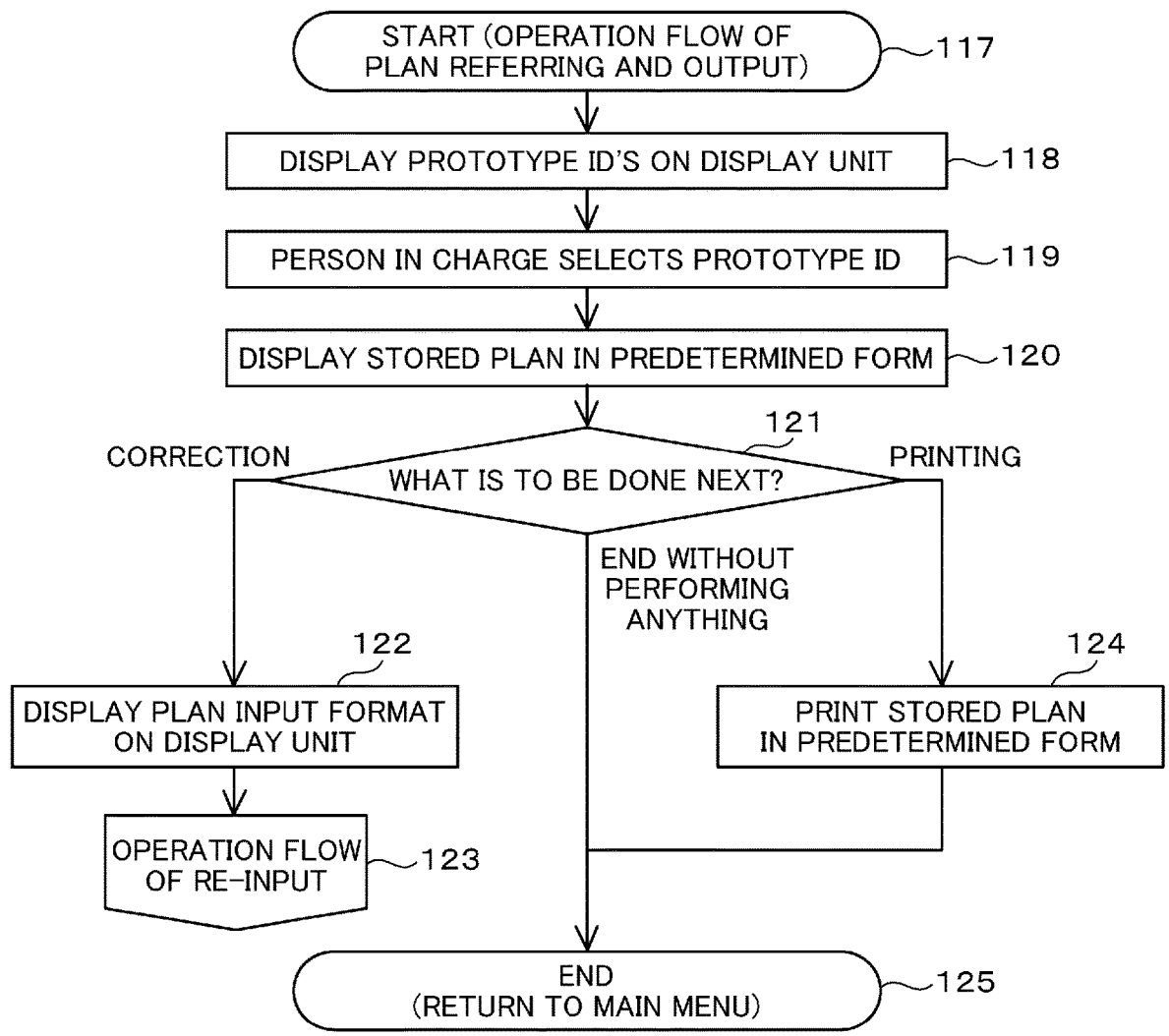
FIG. 5 is a plan referring and output flowchart of the material development assistance system.

FIG. 5 is a flowchart illustrating the process procedure of a plan referring and output process for performing the referring and output of the plan. When it is determined in step 105 illustrated in FIG. 4 that the plan input is not new (step 105; No), the control device 40 goes to step 117, and starts the plan referring and output process.

In step 118, the control device 40 displays the prototype IDs on the display unit 12. Desirably, it is possible to distinguish that the prototype ID in which the sample manufacturing by the person in charge himself/herself has not been completed can be plan-changed and that the prototype ID of the prototype in which at least the process to the sample manufacturing has been completed by the person in charge and the prototype ID of the prototype sample-manufactured by other persons in charge cannot be plan-changed. Therefore, in the display form of the prototype ID, the letter size or color is changed, and the display section is changed. Here, the flow for selecting the word corresponding to the index and searching for the prototype IDs for display may be inserted.

In step 119, the plan input/output unit 13 receives, from the person in charge, the selection of the prototype ID in which the person in charge desires to display the contents on the display unit 12.

In step 120, the plan input/output unit 13 transmits the selected prototype ID to the control device 40, and the control device 40 reads the plan corresponding to the prototype ID to transmit the plan to the plan input/output unit 13. The plan input/output unit 13 displays the plan received from the control device 40 in a predetermined form on the display unit 12.

In step 121, the plan input/output unit 13 outputs, to the display unit 12, a display screen for promoting the selection of the next operation with respect to the person in charge. The display screen includes, as the contents displayed, at least a button for selecting the correction of the read plan, a button for printing the read plan, and a button for selecting end without performing anything.

When determining that the person in charge has selected correction (step 121; correction), the plan input/output unit 13 displays the plan input format on the display unit 12 in step 122, and goes to a operation flow of re-input 123 illustrated in FIG. 4.

Also, when determining that the person in charge has selected printing in step 121 (step 121; printing), the plan input/output unit 13 goes to step 124, and outputs the stored plan to the printing unit 14 in a predetermined form. The predetermined form at this time includes design review materials describing the prototype contents, the prototype object, a rough schedule, and the like, a control card describing the details of the sample manufacturing process, working instructions for requiring the worker to perform the sample manufacturing, and the like. The printing form includes paper, an electronic file, and the like.

On the other hand, when determining in step 121 that the person in charge has selected end without performing anything (step 121; end without performing anything), the plan input/output unit 13 goes to step 125 after the completion of step 124, and displays the main menu on the display unit 12.

Figure 6:
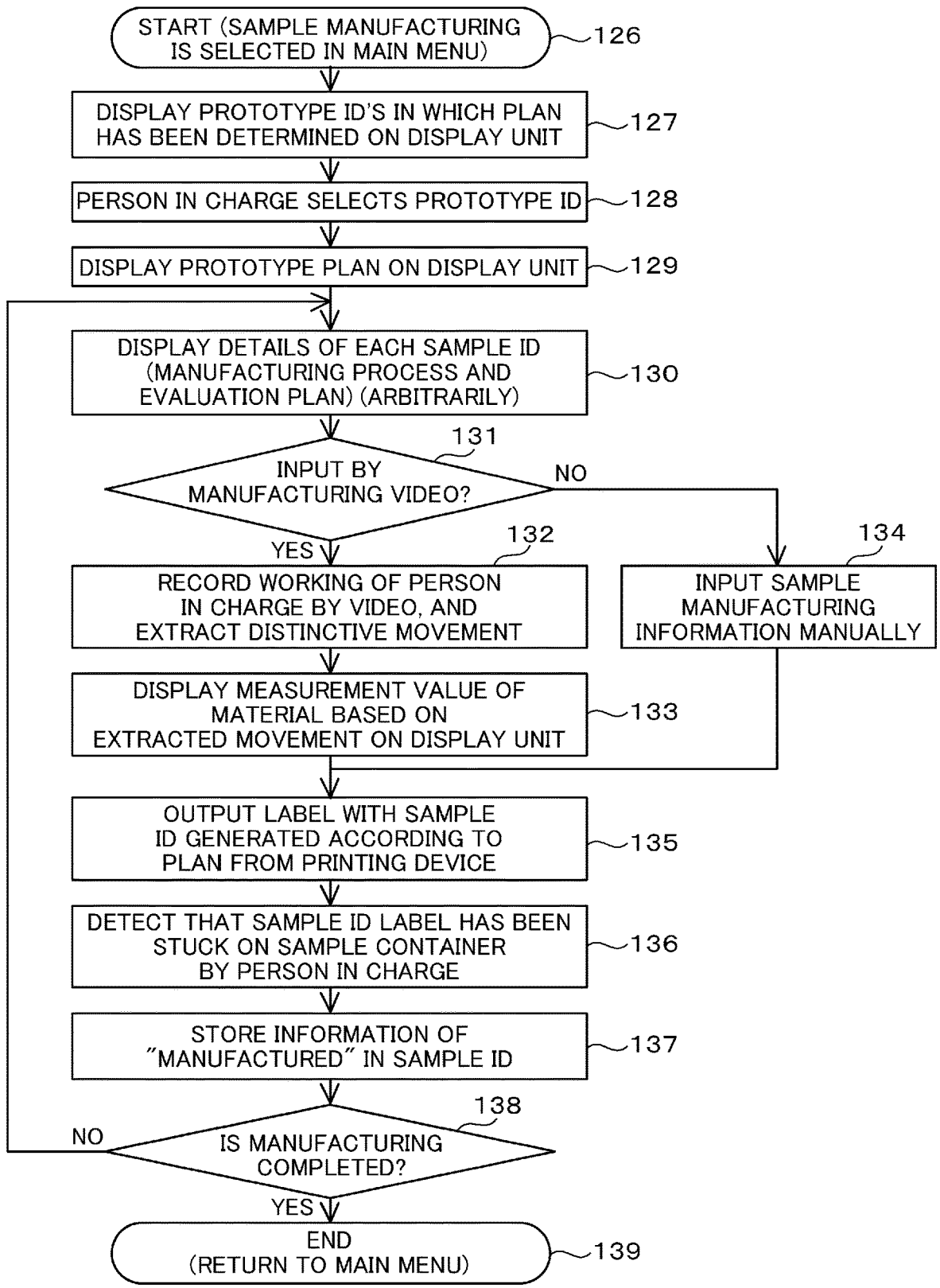
FIG. 6 is a sample manufacturing data storage flowchart of the material development assistance system.

FIG. 6 is a flowchart illustrating the process procedure of a manufacturing data storage process for storing sample manufacturing data. In the following steps, it is assumed that the person in charge works at the sample manufacturing place, and it is assumed that the personal ID is read by the ID reading unit 21 of the manufacturing data storage device 20 according to the flow of FIG. 3, and the main menu is displayed on the display unit 22.

In step 126, when receiving the operation for selecting the sample manufacturing from the main menu by the person in charge, the recording unit 23 of the manufacturing data storage device 20 starts the following operation flow. Alternatively, since it is apparent that the working is the working at the sample manufacturing place, the recording unit 23 may directly go to the next step 127 from step 103 (FIG. 3) that has identified the personal ID.

In step 127, the recording unit 23 displays, on the display unit 22, the prototype IDs in which the plan has been determined. The recording unit 23 displays a selection menu including the prototype IDs the sample manufacturing has been completed, in order that the person in charge can browse, for reference, the prototype IDs in which the sample manufacturing has been completed. For example, the control device 40 searches for the prototype IDs in which the final report is recorded in the milestone included in the prototype plan, from the inside of the storage device 50, and transmits the prototype IDs obtained from the searching to the manufacturing data storage device 20. The recording unit 23 displays the prototype IDs received from the control device 40 in a selectable form (for example, a pulldown form) on the selection menu. However, since the re-writing of the information of the prototype IDs in which the sample manufacturing has been completed is prohibited, the recording unit 23 displays the display section of the prototype IDs as a read-only item.

In step 128, the person in charge selects the prototype ID including the sample to manufacture, and the input is received by the recording unit 23.

In step 129, the recording unit 23 transmits the selected prototype ID to the control device 40, and the control device 40 calls the prototype plan associated with the corresponding prototype ID from the storage device 50. The control device 40 transmits the called prototype plan to the manufacturing data storage device 20, and the recording unit 23 displays the prototype plan on the display unit 22. The called prototype plan includes the respective items (the items illustrated in FIGS. 12 to 15) associated with the prototype ID.

In step 130, the recording unit 23 further displays the details of the prototype plan on the display unit 22. This display may be substituted for the paper outputted in the step 124, and may display the same file as the electronic file outputted in the same step 124.

In step 131, when the person in charge starts the sample manufacturing, the recording unit 23, to the display unit 22, displays inquiring of the person in charge whether the person in charge approves the extraction of the sample manufacturing information from the video which is imaged the manufacturing recording by a camera so as to prevent the load of the working. When determining that the person in charge has approved the imaging (step 131; Yes), the recording unit 23 goes to step 132.

Here, the recording unit 23 starts up an imaging unit 25 including a CCD (Charge Coupled Device) camera and the like. The imaging unit 25 is not necessarily required to be provided in the manufacturing data storage device 20. For example, the imaging unit 25 may be mounted on the head protector that the person in charge wears or on the chest of the working clothes, or may be mounted at the sample manufacturing place, and the recording unit 23 may read the image data imaged by the imaging unit 25 via the network, and record the movement of the hands of the worker. For example, the head protector, such as a pair of safety eyeglasses, directs in the direction along the line of sight of the person in charge, and thus is applicable to the mounting of the camera in order to obtain the video of the object that the person in charge views.

In step 132, the recording unit 23 transmits, to the control device 40, the image data imaged by the imaging unit 25, and the control device 40 extracts, from among the data, the same data as the data including the distinctive movement previously registered to the process DB 52 of the storage device 50. Here, the distinctive movement is, for example, movement measuring the raw material during the sample manufacturing to put the raw material into a predetermined measuring container and its order. In the case of extracting the type of the raw material, when the raw material is put in a reagent bottle or a box, the display of the chemical agent name, the barcode, and the like of the label is read as the distinctive amount.

In step 133, the control device 40 verifies the movement extracted from the image data and the information previously stored in the process DB 52 and the raw material DB 53 of the storage device 50, discriminates the raw material name and its measurement value (the value of the scale of the predetermined measuring container), and displays the raw material name and its measurement value on the display unit 22. For example, the control device 40 refers to the process DB 52 by using, as the key, the image representing the movement included in the data in which the extracted movement is imaged and its order, and reads the same data as the image representing the movement and its order. Further, the control device 40 refers to the raw material DB 53 by using, as the key, the chemical agent name or the barcode described on the label included in the read data, and narrows down, from among the read data, the same data as the chemical agent name or the barcode described on the label. The control device 40 transmits the narrowed-down data to the manufacturing data storage device 20, and the recording unit 23 reads the raw material name and its measurement value included in the data, and displays the raw material name and its measurement value on the display unit 22.

In step 131, when determining that the person in charge has not approved the working video imaging (step 131; No), the recording unit 23 goes to step 134.

In step 134, the recording unit 23 receives, from the person in charge, the input of the sample manufacturing information through the display unit 22. In this case, the recording unit 23 adopts input by a portable tablet serving as the display unit 22, keyboard input, and handwriting input by a pen. In any input, the recording unit 23 goes to step 135 next.

In step 135, the control device 40 prints, from a printing unit 24, the label describing the necessary items including the sample ID given during the planning for the sample performed the measurement in step 133 or step 134. The necessary items include, in addition to the person-in-charge name and the sample ID, the contents that the person in charge desires to describe on the sample container, and includes the barcode made by digitizing the sample ID and the like. For the sample requiring care in handling for safety, the control device 40 may refer to the safety information of the raw material DB 53 of the storage device 50, thereby giving a symbol to the label for each type of handling poisonous substances, toxic substances, and the like, or performing color-coding. Also, the label is conveniently a seal having an adhesive on its back, but is desirably made of a material that does not melt or prevents the letter information from disappearing, even if the chemical agent, water, and the like used for the sample manufacturing adhere onto the label.

In step 136, the recording unit 23 detects that the printed sample ID label has been stuck on the sample container by the person in charge. For example, when the checking button displayed on the display unit 22 and for confirming that the sample ID label has been stuck by the person in charge is depressed, or when the imaging unit 25 images the movement to stick the sample ID label, the recording unit 23 detects that the label has been stuck, and transmits, to the control device 40, the data in which the sample ID and that the sample identified by the sample ID has been manufactured are associated with each other.

In step 137, the control device 40 stores the information of "manufactured" in the data in the storage device 50 including the same sample ID as the sample ID included in the data received from the manufacturing data storage device 20. This is because after this step, the manufacturing process recorded related to the sample ID is required to be protected so as not to be changed.

In step 138, the control device 40 determines whether or not the sample manufacturing has been completed, and when the sample manufacturing has been completed, the control device 40 goes to step 139 (step 138; Yes), and displays the main menu on the display unit 22. On the other hand, when determining that the sample manufacturing has not been completed (step 138; No), the control device 40 repeats the process from step 130 for the next sample ID. For example, whether or not the sample manufacturing has been completed is determined whether or not the control device 40 executes step 137 to store the information of "manufactured" in the data in the storage device 50.

Figure 7:
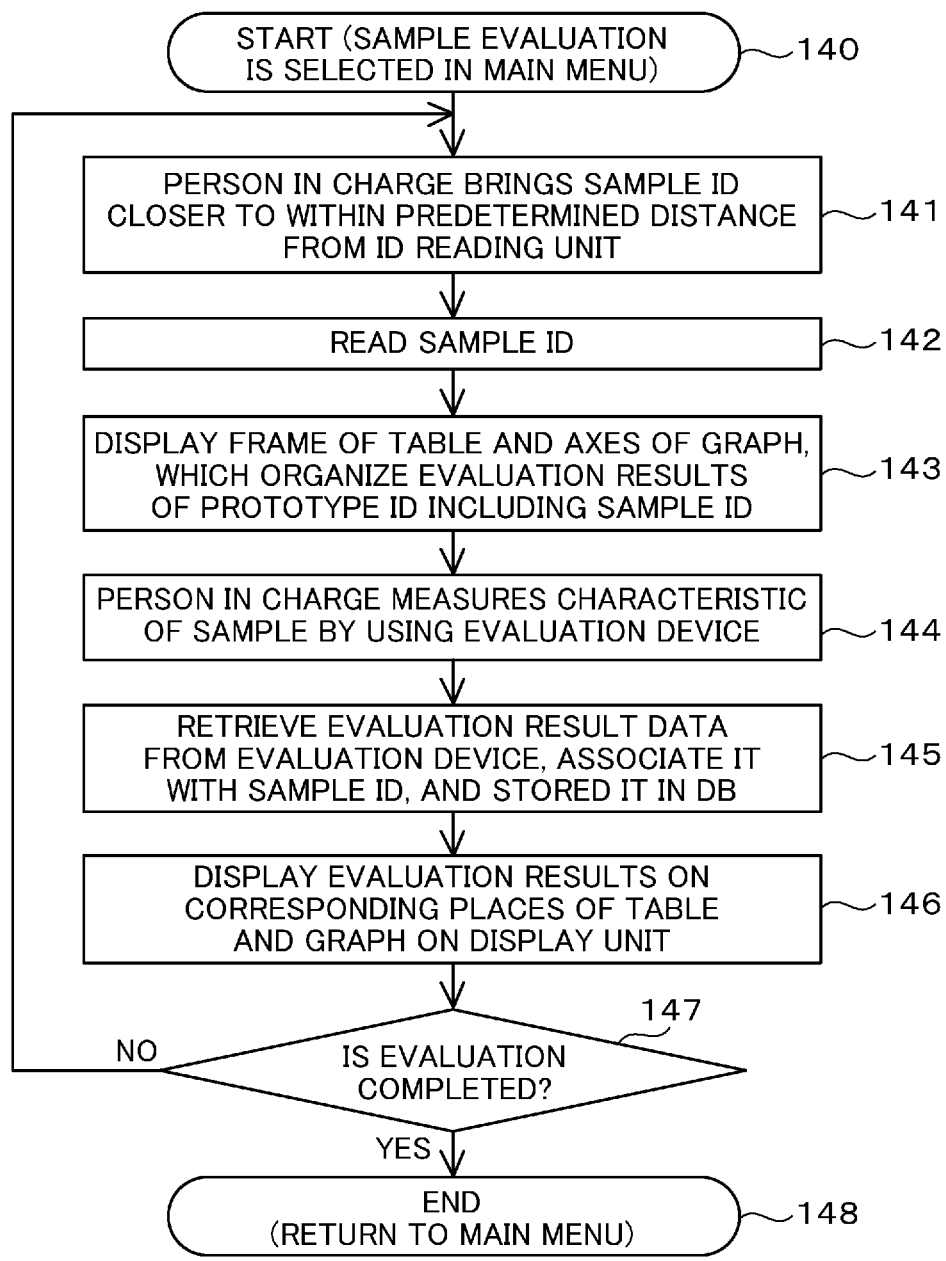
FIG. 7 is a sample evaluation result storage flowchart of the material development assistance system.

FIG. 7 is a flowchart illustrating the process procedure of an evaluation result storage process for storing the results obtained by evaluating the sample. In the following steps, it is assumed that the person in charge works at the sample evaluation place, and it is assumed that the personal ID is read by the ID reading unit 31 of the evaluation result storage device 30 according to the flow of FIG. 3, and the main menu is displayed on the display unit 32.

In step 140, the recording unit 33 of the evaluation result storage device 30 receives, from the person in charge, the selection operation of the sample evaluation from the main menu, and starts the following operation flow.

In step 141, brought closer to the ID reading unit 31, the reading unit 31 detects the sample ID or the barcode, printed on the label stuck on the sample container, including the ID information.

In step 142, the reading unit 31 reads the sample ID, and transmits the sample ID to the control device 40. The control device 40 calls the prototype ID including the sample ID from the storage device 50.

In step 143, the control device 40 outputs the frame of the table and the axes of the graph for organizing the evaluation results in the predetermined form, for example, in the form designated during the planning, and transmits the frame of the table and the axes of the graph to the evaluation result storage device 30. The evaluation result storage device 30 displays these information pieces on the display unit 32. After the evaluation results of the prototype ID including the corresponding sample ID are retrieved, the table and graph are used for displaying the results and listing the results of the same prototype ID. If necessary, the results may be displayed in such a manner that the results of the past prototype IDs may be overlapped therewith.

In step 144, the evaluation unit 33 evaluates the sample in which the parson in charge has allowed the sample ID to be read into the evaluation unit 33. The evaluation unit 33 includes a device suitable for evaluating the characteristic of the sample according to the conditions decided during the planning, and when there are a plurality of evaluation items, a plurality of the configuring devices are sometimes used. When each sample identified by the sample ID is installed by the person in charge, the evaluation unit 33 executes the predetermined evaluation program, and obtains the evaluation results of the sample.

In step 145, the evaluation results are retrieved from the evaluation unit 33, are associated with the sample ID, and are stored in the storage device 50. This is because the person in charge is required to protect the data so that after this, the evaluation results cannot be changed and deleted. When the sample having the same ID is re-evaluated by the same evaluation unit 33, the evaluation unit 33 gives a branch number to the sample ID for issuing, and stores and leaves both of the sample ID and the sample ID with the branch number.

In step 146, the evaluation unit 33 displays an evaluation result screen representing the evaluation results on the display unit 32.

Figure 16:
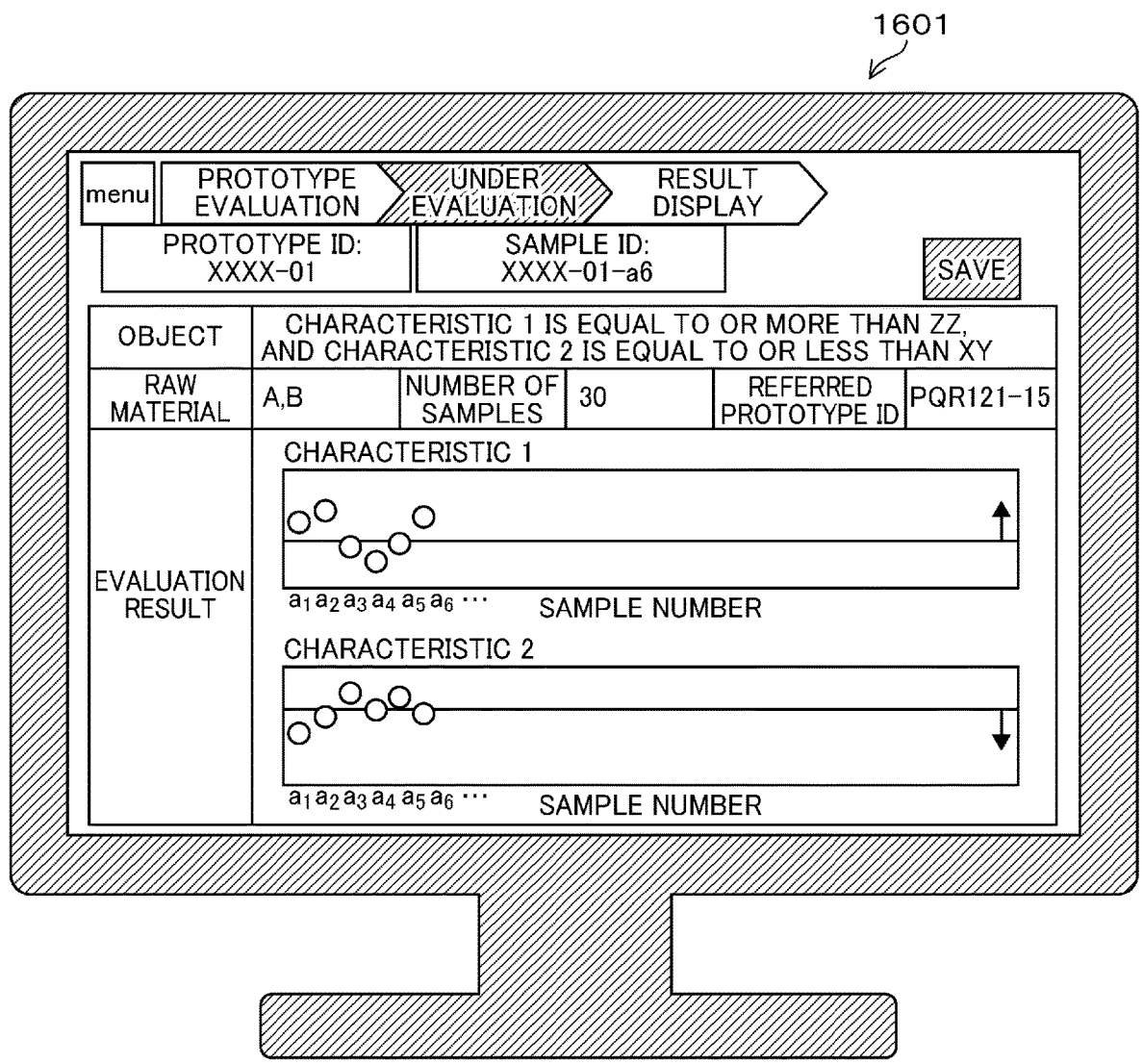
FIG. 16 illustrates the example of the evaluation result screen of the material development assistance system.

FIG. 16 is a diagram illustrating the example of the evaluation result screen. As illustrated in FIG. 16, an evaluation result screen 1601 includes the object, the raw material, the number of samples (these are the same as the contents of the respective items illustrated in FIG. 12), the prototype ID, the sample ID, the referred prototype ID, and the evaluation result. FIG. 16 illustrates that in the prototype plan identified by the prototype ID "XXXX-01", the evaluation result when using the samples identified by the sample ID "XXXX-01-a6" is displayed so as to be associated with the referred prototype ID "PQR121-15", the object, the raw material, and the number of samples.

In step 147, the control device 40 determines whether or not the evaluation by the evaluation unit 33 has been completed, and when other samples to be evaluated are left, and when the evaluation is performed by other evaluation units 33 (step 147; No), the flow from step 141 is repeated. On the other hand, when determining that the evaluation by the evaluation unit 33 has been completed (step 147; Yes), the control device 40 displays the main menu on the display unit 32 in step 148.

Figure 8:
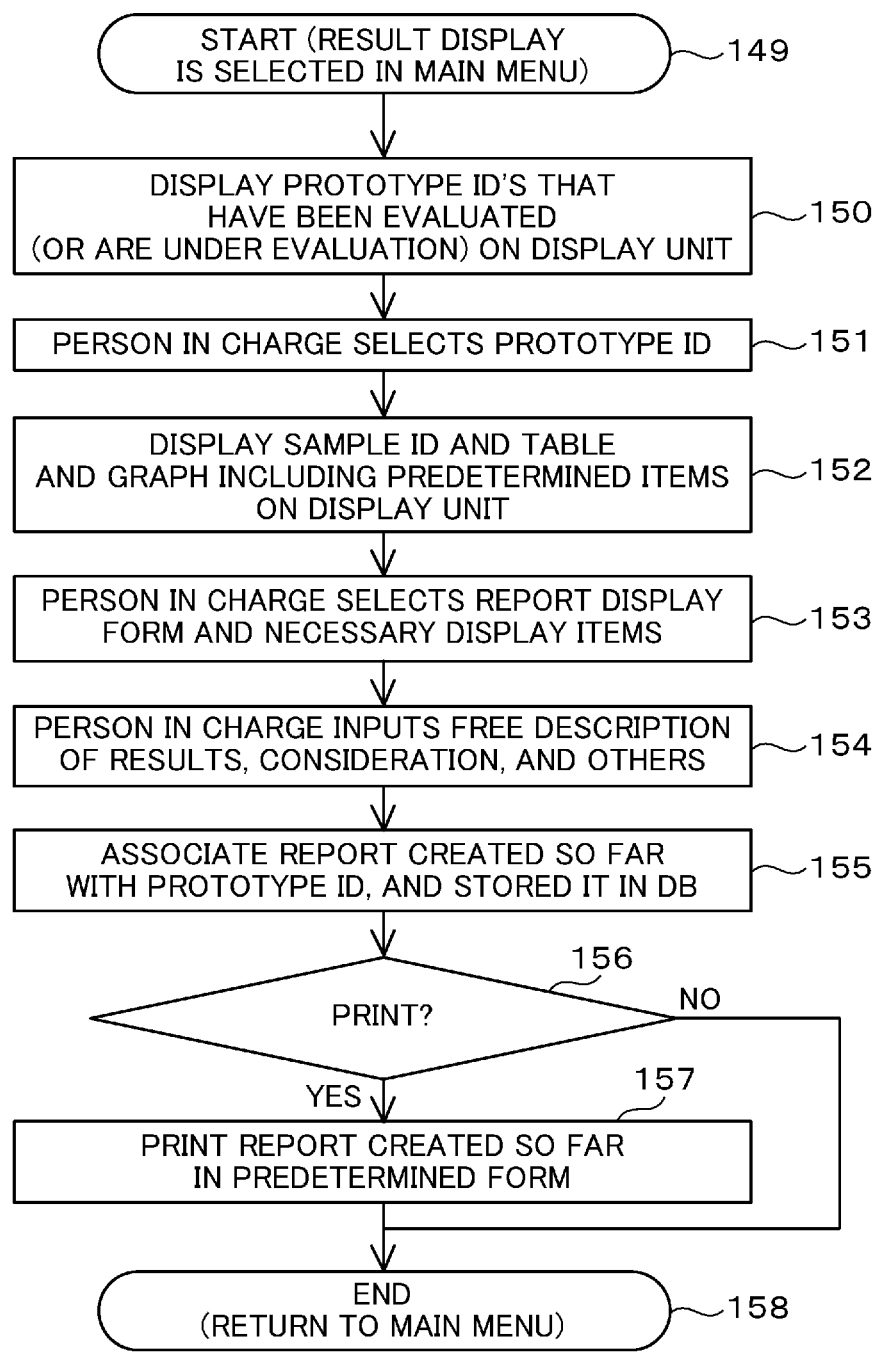
FIG. 8 is a result display and report creation flowchart of the material development assistance system.

FIG. 8 is a flowchart illustrating the process procedure of a report creation process for displaying the prototype results and creating a report. In the following steps, it is assumed that the personal ID is read by the ID reading unit 11 of the plan input/output device 10.

In step 149, the plan input/output unit 13 displays a result display menu on the display unit 12.

In step 150, the plan input/output unit 13 displays, on the display unit 12, the prototype IDs that have been evaluation-completed or are under evaluation.

In step 151, the plan input/output unit 13 receives the selection of the prototype ID that the person in charge desires to display the results.

In step 152, the plan input/output unit 13 transmits the selected prototype ID to the control device 40, the control device 40 reads the prototype ID and the predetermined items inputted by the person in charge during the planning from the inside of the storage device 50, and the plan input/output unit 13 displays, on the display unit 12, the read items and the graphs illustrated in the report.

In step 153, the plan input/output unit 13 receives, from the person in charge, the selection of the display form of the report and the necessary display items. For example, examples of the report include an interim report, a final report, and the like, and also, each of such the reports is different in the form for the research department, the business department, the customers, and the like. The above documents are prepared in the form unified in the department, and are stored in the report DB 54 of the storage device 50. In this step, the person in charge can perform the operation to the extent of unnecessary item deletion and graph addition. Also, when the comparison with the results of the past prototype IDs is necessary, two or more prototype IDs are searched for, called, and displayed, including the results other than the results by the person in charge.

In step 154, the plan input/output unit 13 receives, from the person in charge, the input of the free description section of the itemization and consideration of the results and the like. The control device 40 is allowed to use the tool of Materials Informatics, and the itemization and consideration of the results can also be automatically described by the text mining of the past information.

In step 155, the plan input/output unit 13 transmits the inputted information to the control device 40, and the control device 40 associates the report created in this flow with the prototype ID, and stores the report in the report DB 54 of the storage device 50.

In step 156, the plan input/output unit 13 outputs, to the display unit 12, the display inquiring of the person in charge whether printing is performed. When determining that the input of printing has been received from the person in charge (step 156; Yes), the plan input/output unit 13 prints, in step 157, the report created so far in a predetermined form from the printing unit 14. The predetermined form may include paper or an electronic file.

On the other hand, when the printing has been completed or the printing is unnecessary (step 156; No), the plan input/output unit 13 displays the main menu in step 158.

The devices for associating the processes from the prototype plan through the sample manufacturing and the sample evaluation to the report creation with the prototype ID and its operation flow have been described above. By performing the respective processes, the prototype plan, the sample manufacturing information, and the sample evaluation results are associated with the prototype ID, so that the reusable information can be accumulated and managed without increasing the load of the person in charge, and the information of the working process, know-how, failure, and the like can be shared.

The sharing of the information of the working process, know-how, failure, and the like is required to be the mechanism in which the load when the person in charge of research and development provides the information is light and the benefits can be obtained thereby. Therefore, in this embodiment, the necessary information is collected and recorded from the experiment plan absolutely created by the person in charge before research and development, and the plan materials for performing the review between the persons concerned and the report after the completion of the research are automatically generated. With this, the materials creation time of the person in charge can be shortened, and the person in charge can use time for the research itself. The information collected here is stored in the database as the information that can be understood by any person who has some expert knowledge and can be used by the searching and the like. Further, in order for the person in charge himself/ herself to use the stored information, the research and development information is consistently managed in such a manner that the research and development information is associated with the prototype ID from the experiment plan to the evaluation results, and the information can be drawn out when necessary.

Second Embodiment

In this embodiment, since the process performed in step 132 of the manufacturing data storage process (FIG. 6) of the first embodiment is different, the process will be described. A switch is provided in such a manner that the person in charge brings the medium in which the personal ID for personal identification is recorded, for example, an ID card and an IC chip, closer to the ID reading unit 21 of the manufacturing data storage device 20 located at the sample manufacturing place, thereby identifying the personal, and along with it, the power sources of the display unit 22 and the printing unit 24 are turned on. For example, the recording unit 23 of the manufacturing data storage device 20 determines whether or not the ID reading unit 21 has read the personal ID, and when determining that the ID reading unit 21 has read the personal ID, turns on the power sources of the display unit 22 and the printing unit 24. It should be noted that when the ID reading unit 21 is a device different from the recording unit 23, the ID reading unit 21 may perform the above determination, and turn on the power source of the recording unit 23 together with the power sources of the display unit 22 and the printing unit 24. Further, the raw material to be managed is often placed at the sample manufacturing place, and a person who enters the room is sometimes limited. Therefore, in order to turn on the power source of each device in the room by identifying the person who enters the room, the ID reading unit 21, the display unit 22, the recording unit 23, and the printing unit 24 may be engaged with each other.

Figure 9:
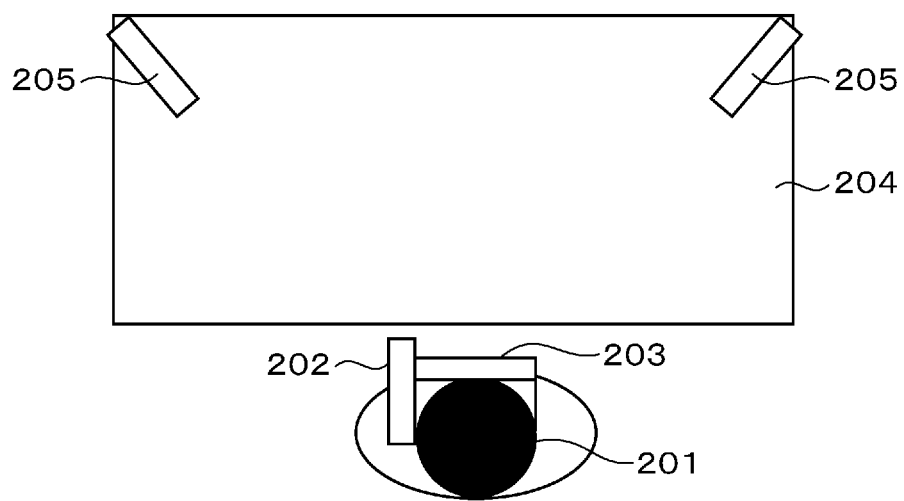
FIG. 9 illustrates a facility at the sample manufacturing place of the material development assistance system.

In step 132 of FIG. 6, in the facility of the sample manufacturing place illustrated in FIG. 9, a person in charge 201 wears a protector 203, such as a pair of safety eyeglasses and a face protector, having a camera 202 that is an example of the imaging unit 25. The imaging unit 25 successively obtains the image of the line-of-sight movement of the person in charge at each timing of, for example, several microseconds. When measuring the amount of the raw material, the person in charge 201 stands still to check the scale of the measuring container. Therefore, the imaging unit 25 may make the obtaining interval of the image longer when the timing of the image recording is within the time in which the person in charge stands still, and may store the image as a moving image when the capacity of the storage device 50 is sufficiently large.

Also, when the sample manufacturing place is a facility 204, such as a clean bench, a draft, and the like, which has a drain or an exhausting equipment and is blocked from the outside, one or a plurality of explosion-proof cameras 205 that are an example of the imaging unit 25 are installed inside the facility 204, thereby obtaining the image from an angle different from the point of view of the person in charge. The camera 205 can obtain the image around the hands of the person in charge, including the label information of the raw material, for example, the reagent bottle, picked up by the person in charge 201, the arrangement of the instrument used, and the like, and can replay the image. The label information of the reagent is given with a barcode by the manufacturing maker, and can also be used for the loading and unloading management of the reagent. The extraction of the arrangement of the instrument or the operational procedure as a distinctive amount leads to the accumulation of know-how. The movement measuring the reagent among the movements of the person in charge may be performed by machine learning from the distinctive amounts of operation by a plurality of persons in charge, or the distinctive amount may be previously set from the operating method typically performed, and be stored in the storage device 50.

Third Embodiment

Figure 10:
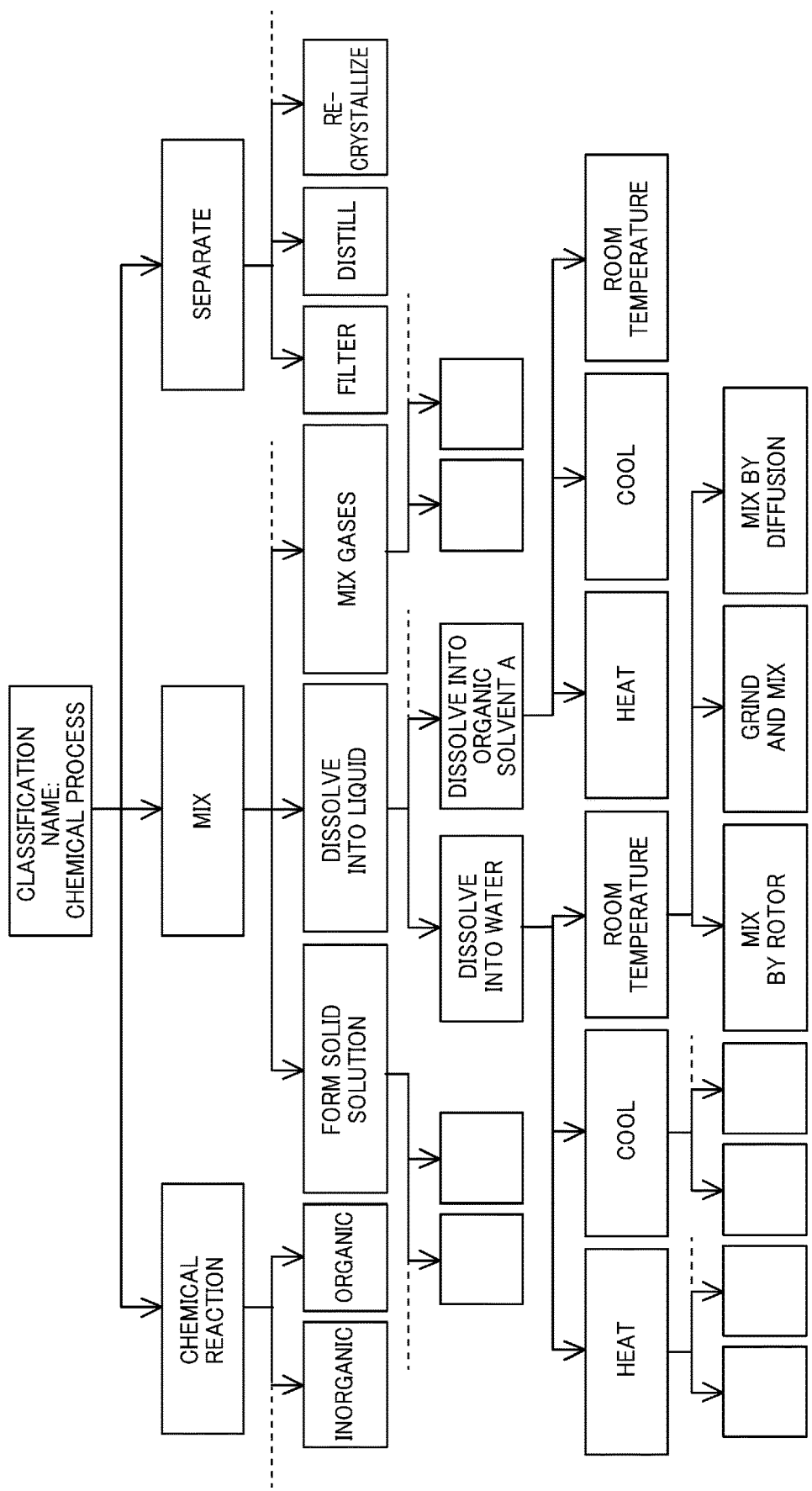
FIG. 10 illustrates the example of the keyword tree of the material development assistance system.

In this embodiment, the specific example of the keyword tree (FIG. 2) in the first embodiment is illustrated. The word falling in the root of the keyword tree is the word for classifying the keyword included in the research plan, and is the classification name of the person-in-charge name, the substance name, the characteristic and performance of the material, the material structure, the material manufacturing process, and the like. In FIG. 10, the example of the chemical process among the material manufacturing processes is illustrated. The chemical process is broadly divided into chemical reaction, mixing, and separation. For example, the tracing of this tree in the case of the process for mixing the solid reagent into pure water at room temperature represents mixing, dissolution into liquid, dissolution into water, room temperature, and grinding and mixing, and a code (for example, grinding) with a small number of letters corresponding to "grinding and mixing" at the tree terminal end is previously created, and is stored as the index of this process. When the word including the word from the "grinding and mixing" to the "mixing" of the tree upstream is designated as a searching word, this process is included in the searching result.

Figure 11:
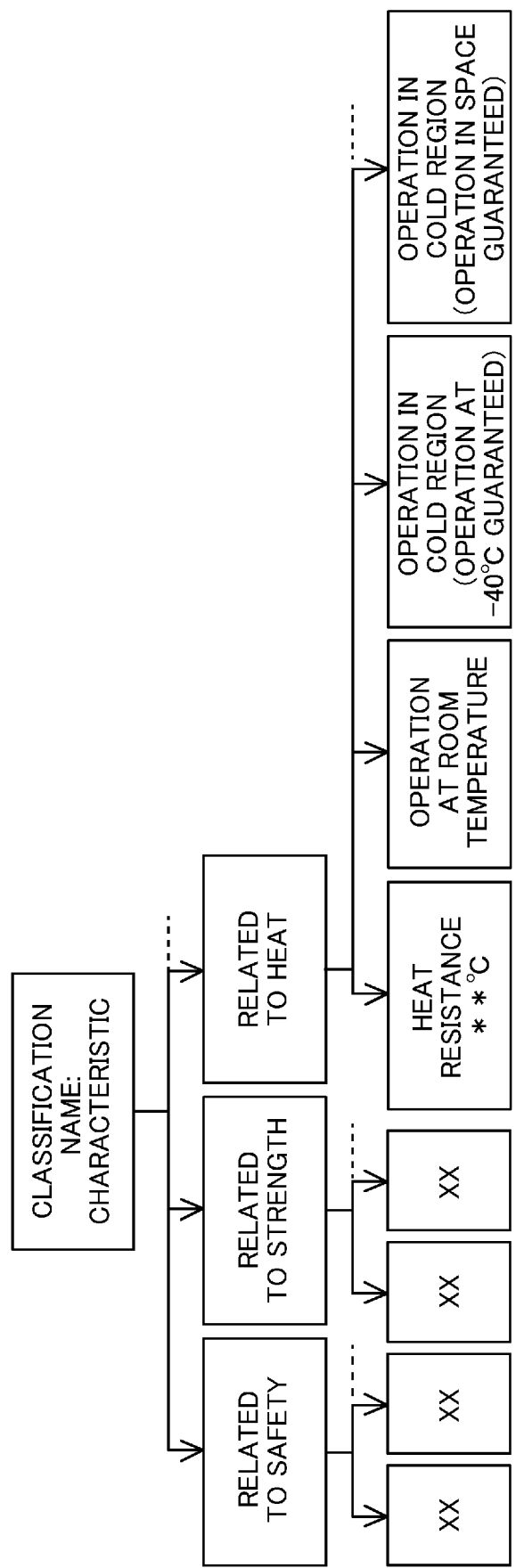
FIG. 11 illustrates the example of the keyword tree of the material development assistance system.

FIG. 11 illustrates the example of the classification of the characteristic and performance of the material to be prototyped. For example, in the case of the material used in the cold region on the earth, the control device 40 gives the index of "operation in cold region (−40° C. guaranteed)" to store the keyword tree. Since the same material also guarantees the characteristics related to safety and strength sometimes, the control device 40 may give an index corresponding to each of the characteristics. In this case, a plurality of indexes are given to one prototype ID.

As described above, in the material development assistance system 1000 that assists the research and development of the material, a first control unit (for example, the plan input/output unit 13) gives, based on the input information inputted as the prototype plan of the material from the user who is the person in charge (for example, the word included in the information collected by each of the manufacturing data storage device 20 and the evaluation result storage device 30) and the keyword configuring the keyword tree stored in the storage device 50, the prototype ID for identifying the prototype plan to the input information, a second control unit (for example, the control device 40) associates the keyword corresponding to the input information given the prototype ID with the index of the input information, and accumulates the associated index in the storage device 50 as the tree structure for each classification group that is the unit of the research and development of the material, a third control unit (for example, the control device 40) determines whether or not the index for the classification group accumulated in the storage device 50 and the input information are in the predetermined relation (for example, in the relation in which the index and the input information are the same from the comparison of both), and when determining that the index and the input information are in the predetermined relation, reads the past prototype plan using the index from the storage device 50, and a fourth control unit (for example, the plan input/output unit 13) outputs, as the plan of the user, the new prototype plan created by referring to the read past prototype plan, the new prototype plan being given the prototype ID and the sample ID for identifying the material used in the prototype plan, so that the reusable information can be accumulated and managed without increasing the load of the person in charge in the material research and development, and the load of the input working of the prototype plan by the person in charge can be reduced.

Also, the fourth control unit outputs, to the display unit, the prototype plan and sample display screen in which the prototype plan, the prototype ID, and the sample ID are associated with each other, so that the person in charge can grasp the prototype ID used for the corrected prototype plan at a glance, and can easily identify the sample ID of the sample used in the prototype plan.

Also, the recording unit 23 reads, based on the movement image data imaged by the imaging unit 25 imaging the movement of the user, the image data representing the movement of the user including the raw material of the material and the measurement value of the raw material, and the distinctive image data representing the distinctive movement for manufacturing the material previously stored in the storage device 50, the raw material manufactured by the movement of the user and the measurement value, and displays the raw material and the measurement value on the display unit (for example, the display unit 22), so that the distinctive movement of the user can be objectively grasped from the image, and the raw material used in the movement and the measurement value of the raw material can be easily grasped.

Also, the printing unit 24 prints the label of the sample ID given by the fourth control unit for the raw material read by the recording unit 23, so that the label is automatically created, and the trouble for label creation by the user can be eliminated.

Also, the imaging unit 25 is mounted on the head of the user, and images the movement of the line-of-sight of the user, so that the movement can be grasped from the point of view of the user, and how the user has moved can be grasped at a glance.

It should be noted that the process of each embodiment is achieved in such a manner that the CPU (Central Processing Unit) of each of the plan input/output device 10, the manufacturing data storage device 20, the evaluation result storage device 30, and the control device 40 reads the program stored in the ROM (Read Only Memory), loads the program onto the RAM (Random access memory), and executes the program.

The program may be downloaded from the network, be loaded onto the RAM, be executed by the CPU. Also, the program is directly loaded onto the RAM from the storage medium through the reading/writing device for reading and writing information from and to the computer-readable storage medium having portability, such as a CD (Compact Disk) and a DVD (Digital Versatile Disk), and may be executed by the CPU. Further, the program may be recorded in the storage medium by a file in the form of being capable of being installed on the computer or in the form of being capable of being executed by the computer, and be provided and distributed. Furthermore, the program may be stored on the computer connected to the communication network, be downloaded via the network, and be provided and distributed.

What is claimed is:

1. A material development assistance system that assists the research and development of a material, comprising:
a memory;
an input/output device; and
a processor communicatively coupled to the memory and the input/output device, wherein the processor is configured to:
give, based on input information inputted as a prototype plan of the material from a user and a keyword configuring a keyword tree stored in the memory, a prototype ID for identifying the prototype plan to the input information;
associate the keyword corresponding to the input information given the prototype ID with the index of the input information and accumulate an associated index in the memory as a tree structure for each of a plurality of classification groups that is the unit of the research and development of the material;
determine whether or not the index for the classification group accumulated in the memory and the input information are in a predetermined relation,
when determining that the index and the input information are in the predetermined relation,
receive, as an input from the input/output device, at least one of the plurality of classification groups,
read a past prototype plan using the index from the memory,
revise the prototype plan based on the input received and the past prototype plan,
output, as the plan of the user, a new prototype plan created from the revised prototype plan, the new prototype plan being given the prototype ID and a sample ID for identifying the material used in the prototype plan.

2. The material development assistance system according to claim 1, wherein the processor outputs, to a display unit, the prototype plan and sample display screen in which the created prototype plan, the prototype ID, and the sample ID are associated with each other.

3. The material development assistance system according to claim 1, further comprising:
an imaging unit imaging the movement of the user; and
a recording unit reading, based on movement image data imaged by the imaging unit, the image data representing the movement of the user including the raw material of the material and the measurement value of the raw material and distinctive image data representing distinctive movement for manufacturing the material previously stored in the memory, the raw material manufactured by the movement of the user and the measurement value, and displaying the raw material and the measurement value on a display unit.

4. The material development assistance system according to claim 3, further comprising a printing unit printing the label of the sample ID given by the processor for the raw material read by the recording unit.

5. The material development assistance system according to claim 3, wherein the imaging unit is mounted on the head of the user, and images the movement of the line-of-sight of the user.

6. A material development assistance method that assists the research and development of a material, the method comprising:
creating, via a processor, based on input information inputted as a prototype plan of the material from a user and a keyword configuring a keyword tree stored in a memory, a prototype ID for identifying the prototype plan to the input information, associating, via the processor, the keyword corresponding to the input information given the prototype ID with the index of the input information, and accumulates an associated index in the memory as a tree structure for each of a plurality of classification groups that is the unit of the research and development of the material, determining, via a processor, whether or not the index for the classification group accumulated in the memory and the input information are in a predetermined relation, when determining that the index and the input information are in the predetermined relation, receiving, as an input from an input/output device, at least one of the plurality of classification groups, reading, from the memory, a past prototype plan using the index from the memory revising the prototype plan based on the input received and the past prototype plan, outputting, as the plan of the user, a new prototype plan created from the revised prototype plan, the new prototype plan being given the prototype ID and a sample ID for identifying the material used in the prototype plan.

7. The material development assistance method according to claim 6, wherein the processor outputs, to a display unit, the prototype plan and sample display screen in which the created prototype plan, the prototype ID, and the sample ID are associated with each other.

8. The material development assistance method according to claim 6, wherein a recording unit reads, based on movement image data imaged by the imaging unit imaging the movement of the user, the image data representing the movement of the user including the raw material of the material and the measurement value of the raw material and distinctive image data representing distinctive movement for manufacturing the material previously stored in the memory, the raw material manufactured by the movement of the user and the measurement value, and displays the raw material and the measurement value on a display unit.

9. The material development assistance method according to claim 8, wherein a printing unit prints the label of the sample ID given by the processor for the raw material read by the recording unit.

10. The material development assistance method according to claim 8, wherein the imaging unit mounted on the head of the user images the movement of the line-of-sight of the user.

* * * * *